United States Patent
Ham et al.

(10) Patent No.: US 11,405,494 B2
(45) Date of Patent: Aug. 2, 2022

(54) MOUNTING DEVICE FOR ELECTRONIC DEVICE

(71) Applicant: Samsung Electronics Co., Ltd., Gyeonggi-do (KR)

(72) Inventors: Sunwoong Ham, Gyeonggi-do (KR); Hakdo Kim, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 215 days.

(21) Appl. No.: 16/801,351

(22) Filed: Feb. 26, 2020

(65) Prior Publication Data

US 2020/0274957 A1    Aug. 27, 2020

(30) Foreign Application Priority Data

Feb. 26, 2019  (KR) .................. 10-2019-0022725

(51) Int. Cl.
*H04M 1/02*   (2006.01)
*G06F 1/16*   (2006.01)

(52) U.S. Cl.
CPC ........ *H04M 1/0227* (2013.01); *G06F 1/1681* (2013.01); *H04M 1/026* (2013.01)

(58) Field of Classification Search
CPC .... H04M 1/0227; H04M 1/026; G06F 1/1681
See application file for complete search history.

(56) References Cited

U.S. PATENT DOCUMENTS

| | | |
|---|---|---|
| 5,941,493 A | 8/1999 | Cheng |
| 7,986,777 B2 | 7/2011 | Daly et al. |
| 8,047,488 B2 | 11/2011 | Wang et al. |
| 8,282,060 B2 | 10/2012 | Fan |

(Continued)

FOREIGN PATENT DOCUMENTS

| | | |
|---|---|---|
| DE | 102007026203 A1 | 3/2008 |
| EP | 2210533 A1 | 7/2010 |

(Continued)

OTHER PUBLICATIONS

International Search Report dated Jun. 24, 2020.
European Search Report dated Feb. 8, 2022.

*Primary Examiner* — Robert J Hoffberg
*Assistant Examiner* — Hung Q Dang
(74) *Attorney, Agent, or Firm* — Cha & Reiter, LLC

(57) ABSTRACT

Disclosed is a mounting device for an electronic device. The mounting device comprises a plate including a first surface and a second surface opposite to the first surface, the first surface configured to receive the electronic device; a hinge structure disposed on the second surface of the plate, the hinge structure including a rotary shaft extending from the second surface and a hinge shaft extending along the second surface; and a support member coupled to the hinge shaft, the support member including a first portion extending from the hinge shaft by a first length and a second portion extending from the hinge shaft by a second length smaller than the first length, wherein the hinge structure is configured to rotate about the rotary shaft, and wherein the support member is configured to rotated about the hinge shaft such that the first portion can make contact with the second surface of the plate and the second portion can make contact with the second surface of the plate.

20 Claims, 9 Drawing Sheets

(56) References Cited

U.S. PATENT DOCUMENTS

| | | |
|---|---|---|
| 8,456,834 B2 | 6/2013 | Zhu et al. |
| 8,471,820 B2 | 6/2013 | Holman, IV et al. |
| 8,593,798 B2 | 11/2013 | Moon et al. |
| 8,706,175 B2 | 4/2014 | Cho |
| 8,824,166 B2 | 9/2014 | Rohrbach |
| 8,941,989 B2 | 1/2015 | Pollex |
| 9,163,433 B2 | 10/2015 | Sedon |
| 9,163,775 B2 | 10/2015 | Rohrbach |
| 9,229,477 B2 | 1/2016 | Morrison et al. |
| 9,591,778 B1 * | 3/2017 | Mercier ............... H05K 5/0017 |
| 9,839,147 B2 | 12/2017 | Rohrbach |
| 9,857,022 B2 * | 1/2018 | Liu ..................... F16M 11/38 |
| 9,968,188 B1 | 5/2018 | Floersch et al. |
| 10,085,551 B2 | 10/2018 | Floersch et al. |
| 10,176,345 B2 | 1/2019 | Sedon |
| 2007/0286410 A1 | 12/2007 | Daly et al. |
| 2010/0171011 A1 | 7/2010 | Wang et al. |
| 2011/0182007 A1 | 7/2011 | Zhu et al. |
| 2011/0228457 A1 | 9/2011 | Moon et al. |
| 2011/0290970 A1 | 12/2011 | Fan |
| 2012/0075799 A1 | 3/2012 | Pollex |
| 2012/0118770 A1 | 5/2012 | Valls et al. |
| 2012/0249428 A1 | 10/2012 | Holman, IV et al. |
| 2012/0252543 A1 | 10/2012 | Cho |
| 2012/0326003 A1 | 12/2012 | Solow et al. |
| 2013/0068916 A1 | 3/2013 | Mensing et al. |
| 2014/0118930 A1 | 5/2014 | Sedon |
| 2015/0292669 A1 | 10/2015 | Floersch et al. |
| 2016/0004886 A1 | 1/2016 | Sedon |
| 2016/0109905 A1 | 4/2016 | Morrison et al. |
| 2016/0161988 A1 | 6/2016 | Reymond et al. |
| 2016/0215926 A1 | 7/2016 | Pollex |
| 2018/0070464 A1 | 3/2018 | Rohrbach |
| 2018/0080597 A1 | 3/2018 | Weldon |
| 2018/0235362 A1 | 8/2018 | Floersch et al. |
| 2019/0122009 A1 | 4/2019 | Sedon |
| 2019/0182972 A1 | 6/2019 | Rohrbach |

FOREIGN PATENT DOCUMENTS

| | | |
|---|---|---|
| EP | 2506538 B1 | 3/2014 |
| GB | 2512884 A | 10/2014 |
| KR | 10-2016-0058527 A | 5/2016 |

* cited by examiner

MOUNTING DEVICE FOR ELECTRONIC DEVICE

CROSS-REFERENCE TO RELATED APPLICATION(S)

This application is based on and claims priority under 35 U.S.C. § 119 to Korean Patent Application No. 10-2019-0022725, filed on Feb. 26, 2019, in the Korean Intellectual Property Office, the disclosure of which is incorporated by reference herein its entirety.

BACKGROUND

1. Field

The disclosure relates to a mounting device for an electronic device.

2. Description of Related Art

In recent years, rapid improvements with mobile electronic devices, has caused desktop PCs or laptop PCs to be replaced with the mobile electronic devices. Accordingly, there is a demand for devices capable of mounting the mobile electronic devices on desks at certain view angles.

The mobile electronic devices generally have a rectangular shape with a pair of parallel short sides and a pair of parallel long sides. The mobile electronic devices may include a landscape mode in which the long sides are horizontal and the short sides are vertical and a portrait mode in which the short sides are horizontal and the long sides are vertical.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, a mounting device for mounting an electronic device comprises a plate including a first surface and a second surface opposite to the first surface, the first surface configured to receive the electronic device; a hinge structure disposed on the second surface of the plate, the hinge structure including a rotary shaft extending from the second surface and a hinge shaft extending along the second surface; and a support member coupled to the hinge shaft, the support member including a first portion extending from the hinge shaft by a first length and a second portion extending from the hinge shaft by a second length smaller than the first length, wherein the hinge structure is configured to rotate about the rotary shaft, and wherein the support member is configured to rotated about the hinge shaft such that the first portion can make contact with the second surface of the plate and the second portion can make contact with the second surface of the plate.

In accordance with an aspect of the disclosure a mounting device for an electronic device comprise a plate including a first surface and a second surface opposite to the first surface, a first pair of edges, and a second pair of edges substantially perpendicular to the pair of first edges, wherein the first surface is configured to receive the electronic device; a rotary shaft extending from the second surface and coupled to the plate so as to be rotatable; and a support member rotatable about the rotary shaft, the support member extending from the second surface of the plate at an angle, wherein the mounting device is configurable to a first position in which the support member and one of the first pair of edges are supported on the ground and a second position in which the support member and one of the second pair of edges are supported on the ground, wherein the plate forms substantially the same angle with respect to the ground in the first position and the second position, and wherein the rotary shaft is formed at substantially the same distance from the one of the first pair of edges and the one of the second pair of edges.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The mounting devices in the may provide different view angles in the landscape mode and the portrait mode, but supporting only one of the landscape mode and the portrait mode, is inconvenient to the user.

Accordingly, an aspect of the disclosure may provide a mounting device through which a display area forms the same view angle in a landscape mode and a portrait mode. Furthermore, another aspect of the disclosure may provide a mounting device for forming a view angle at which a user can easily handwrite or draw on a touch screen display of a mobile electronic device.

Figure 1:
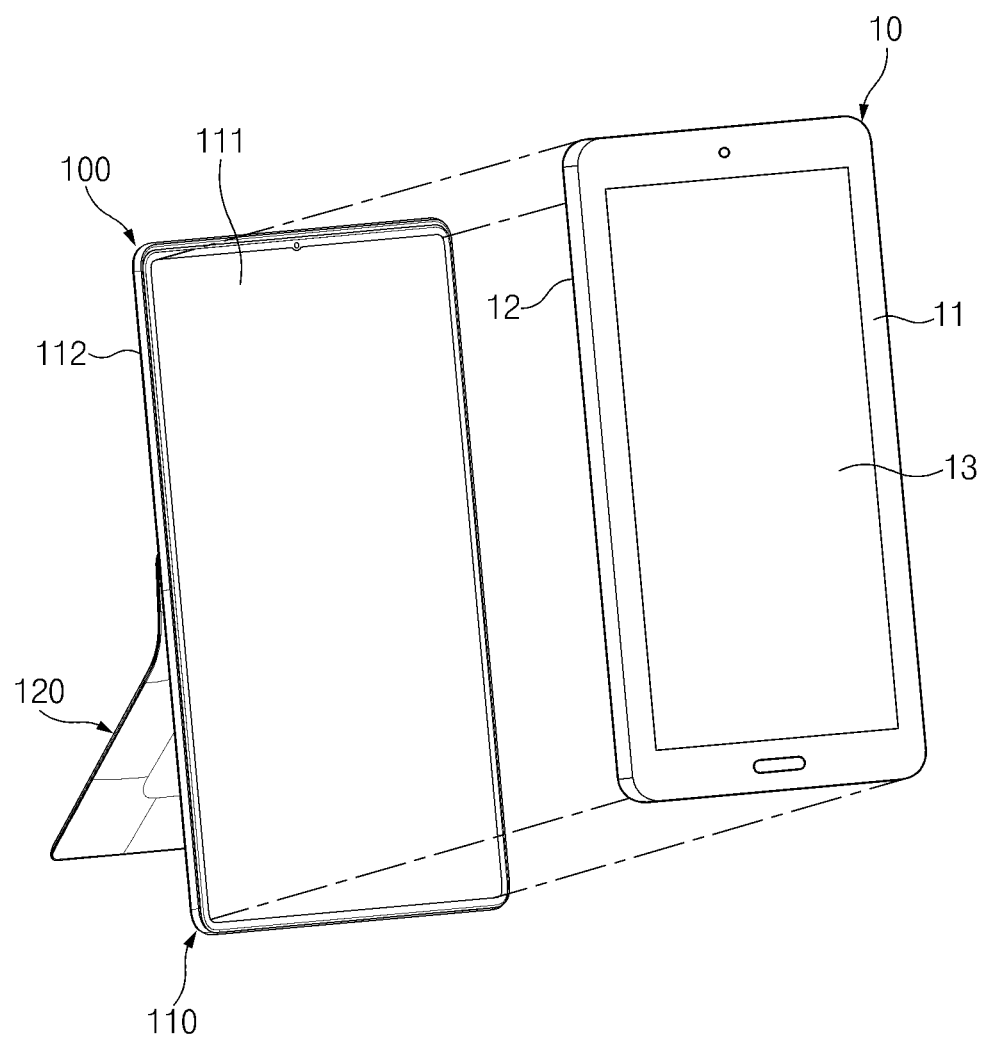
FIG. 1 is a view illustrating a coupling of an electronic device and a mounting device for the electronic device according to an embodiment.

FIG. 1 is a view illustrating a coupling of an electronic device 10 and a mounting device 100 for the electronic device (hereinafter, referred to as the mounting device) according to an embodiment.

In certain embodiments, the mounting device 100 may be configured to receive the electronic device 10, such that a display area of the electronic device forms the same view angle, whether the electronic device 10 is in the landscape mode or the portrait mode. Additionally, the view angle may be an angle that is convenience for a user to hand write on the display of the electronic device 10.

The electronic device 10 disclosed herein may include a portable electronic device 10 such as a smartphone or a tablet PC. The electronic device 10 may include a front surface 11 and a rear surface 12, and a display area 13 may be formed on the front surface 11. Alternatively, the electronic device 10 may include an electronic device 10 having a display area 13 formed on at least one of a front surface 11 or a rear surface 12 thereof.

In the illustrated embodiment, the mounting device 100 may include a plate 110 and a support member 120. The plate 110 may include a first surface 111 and a second surface 112 opposite to the first surface 111. The first surface 111 may be configured to or formed to accommodate receipt of the rear surface 12 of the electronic device 10. For example, in certain embodiments, the dimensions of the first surface 111 may correspond to the dimensions commonly used for the rear surface 12 of the class of devices (such as smartphones or tablets) that include the electronic device 10. In certain embodiments, the first surface 111 may include a ridge, thereon, with dimensions corresponding to the electronic device 10, such that the ridge can detachably connect to the electronic device 10. The support member 120 may have one side coupled to the plate 110 and an opposite side supported on the ground and may allow the plate 110 to form a predetermined angle with respect to the ground.

In the illustrated embodiment, the electronic device 10 may be disposed on the first surface 111 of the plate 110. When the electronic device 10 is disposed on the first surface 111, rear surface 12 of the electronic device 10, the surface of the electronic device that is opposite to the surface that has the display area 13 formed thereon, e.g., the front surface, may be disposed on the first surface 111 of the plate 110.

In some embodiments, the electronic device 10 may include display areas 13 formed on the front surface 11 and the rear surface 12, respectively. In this case, the front surface 11 or the rear surface 12 may be disposed on the first surface 111 of the plate 110.

Figure 2:
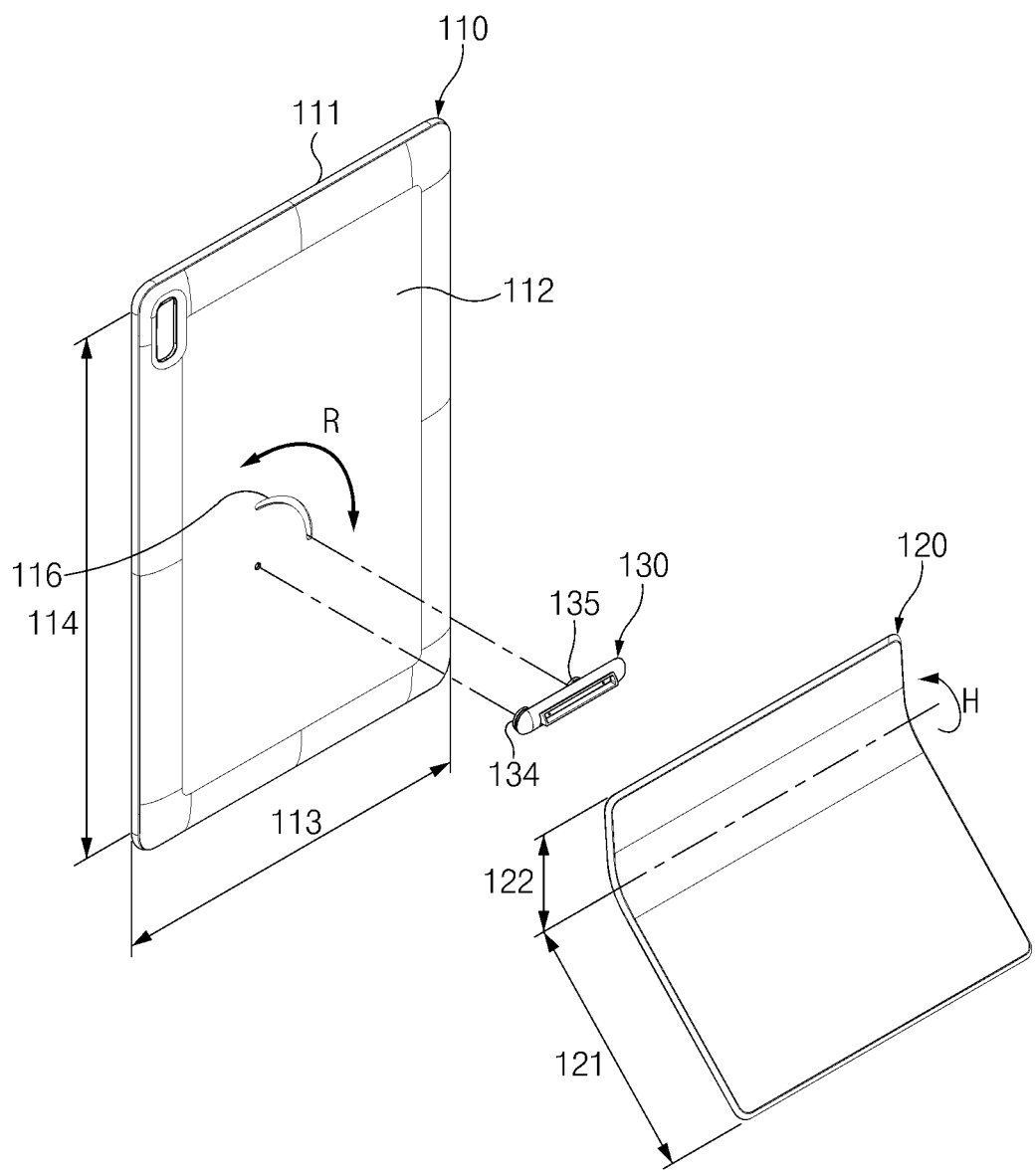
FIG. 2 is an exploded perspective view of the mounting device for the electronic device according to an embodiment.

FIG. 2 is an exploded perspective view of the mounting device 100 for the electronic device according to an embodiment.

In an embodiment, the mounting device 100 may include the plate 110, a hinge structure 130 coupled to the plate 110, and the support member 120 coupled to the hinge structure 130.

In the illustrated embodiment, the plate 110 may include the first surface 111 configured to or formed to accommodate receipt of the rear surface 12 of the electronic device 10 and the second surface 112 that is opposite to the first surface 111 and to which the support member 120 is coupled. The plate 110 may be formed in a size substantially corresponding to the electronic device 10.

Hereinafter, the direction that the first surface 111 faces may be referred to as the first direction, and the direction that the second surface 112 faces may be referred to as the second direction.

In the illustrated embodiment, the support member 120 may include a first portion 121 and a second portion 122 that pivot about a hinge shaft (not illustrated) (in directions H). For example, the support member 120 may include the first portion 121 extending at a first angle with respect to the second surface 112 of the plate 110 and the second portion 122 extending at a second angle with respect to the second surface 112 of the plate 110. The first portion 121 may be longer than the second portion 122.

In certain embodiments, the hinge structure 130 may allow the support member 120 to pivot (in the directions H) and may be rotated (in directions R) on the second surface 112 of the plate 110.

In certain embodiments, the hinge structure 130 may be disposed between the support member 120 and the plate 110. The hinge structure 130 may be connected with the plate 110 and the support member 120 to allow the support member 120 to rotate relative to the plate 110. Specifically, the hinge structure 130 may include the hinge shaft (not illustrated) that is connected with the support member 120.

In certain embodiments, the hinge structure 130 may allow the support member 120 to rotate such that the first portion 121 of the support member 120 makes contact with the second surface 112 of the plate 110 or the second portion 122 of the support member 120 makes contact with the second surface 112 of the plate 110.

In certain embodiments, the hinge structure 130 may be rotated, on the second surface 112 of the plate 110, about a rotary shaft 134 toward which the second surface 112 of the plate 110 is directed. The plate 110 may include a first pair of edges 113 and a second pair of edges 114. The first pair of edges 113 may be parallel or substantially parallel or within 3 degrees of parallel. The second pair of edges 114 may be parallel or substantially parallel or within 3 degrees of parallel. The first pair of edges 113 and the second pair edges 114 may be perpendicular, substantially perpendicular, or within 3 degrees of perpendicular.

Figure 3A:
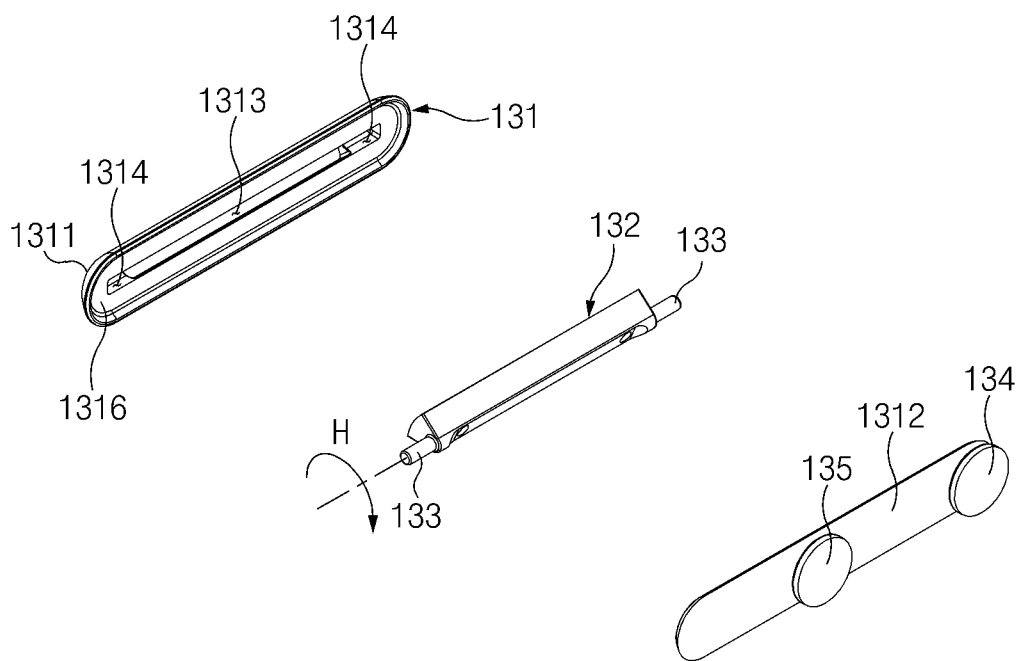
FIGS. 3A and 3B are exploded perspective views of a hinge structure of the mounting device for the electronic device according to an embodiment.
Figure 3B:
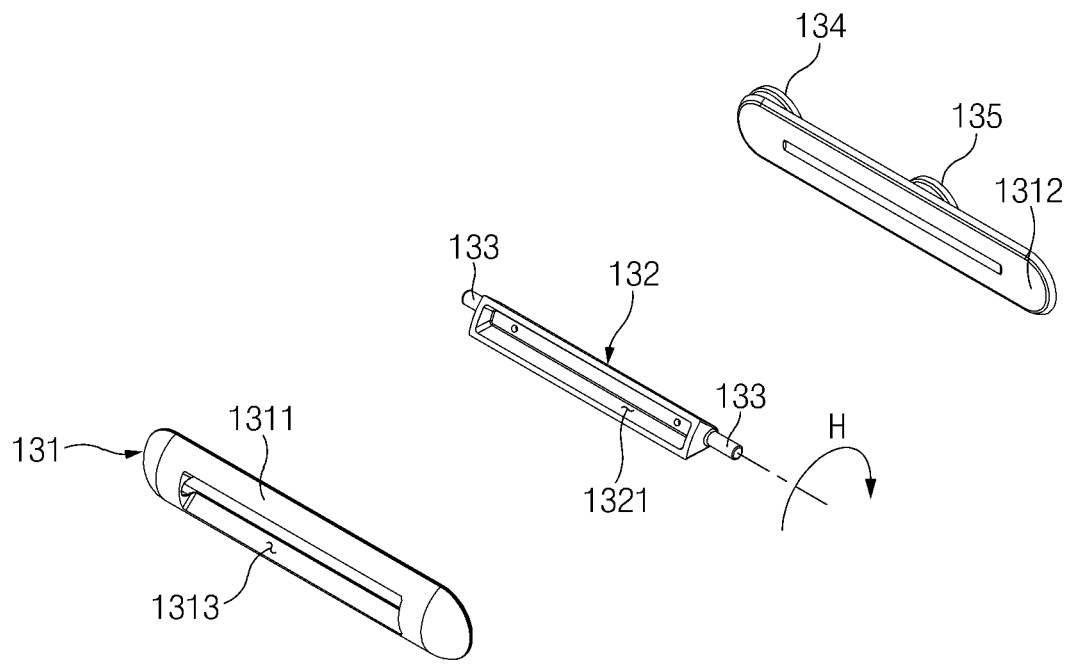

FIGS. 3A and 3B are exploded perspective views of the hinge structure 130 of the mounting device 100 for the electronic device according to an embodiment.

Referring to FIGS. 3A and 3B, the hinge structure 130 may include a hinge housing 131 and a hinge member 132 disposed in the hinge housing 131, and a fastening plate 1312 disposed in front of the hinge member 132.

The hinge housing 131 may include a curved surface 1311 and a flat surface 1316. An opening 1313 may be formed in the flat surface 1316. At least part of the hinge member 132 may be disposed in the opening 1313. The hinge housing 131 may include recesses 1314 therein in which hinge shafts 133 are disposed so as to be rotatable.

In certain embodiments, the curved surface 1311 may correspond to the radius of rotation of the first portion 121 and the second portion 122 of the support member 120. For example, the curved surface 1311 may have a radius of curvature that is smaller than or equal to the radius of rotation of the support member 120.

The hinge member 132 may include one or more hinge shafts 133. The hinge shafts 133 may be coupled to the hinge housing 131 so as to be rotatable. Specifically, the hinge shafts 133 may be disposed in the recesses 1314 formed inside the hinge housing 131. The hinge shafts 133 disposed in the recesses 1314 may support rotation of the hinge member 132.

In certain embodiments, the hinge member 132 may be coupled with the support member 120. Specifically, the hinge member 132 may include a recess 1321 into which part of the support member 120 is inserted.

The fastening plate 1312 is disposed in front of the hinge member 132 and to abut the flat surface 1316, such that the hinge shafts 133 are between the recesses 1314 and the fastening plates 1312. In certain embodiments, the curved surface 1311 can surround and substantially contact the periphery of the fastening plate 1312, such that the fastening plate 1312 is fitted into the hinge housing 131. The fastening plate 1312 prevents egress of the hinge shafts 133 from the recesses 1314. A guide member 135 and a rotary shaft 134 can be disposed or formed on the fastening plate 1312.

Figure 4:
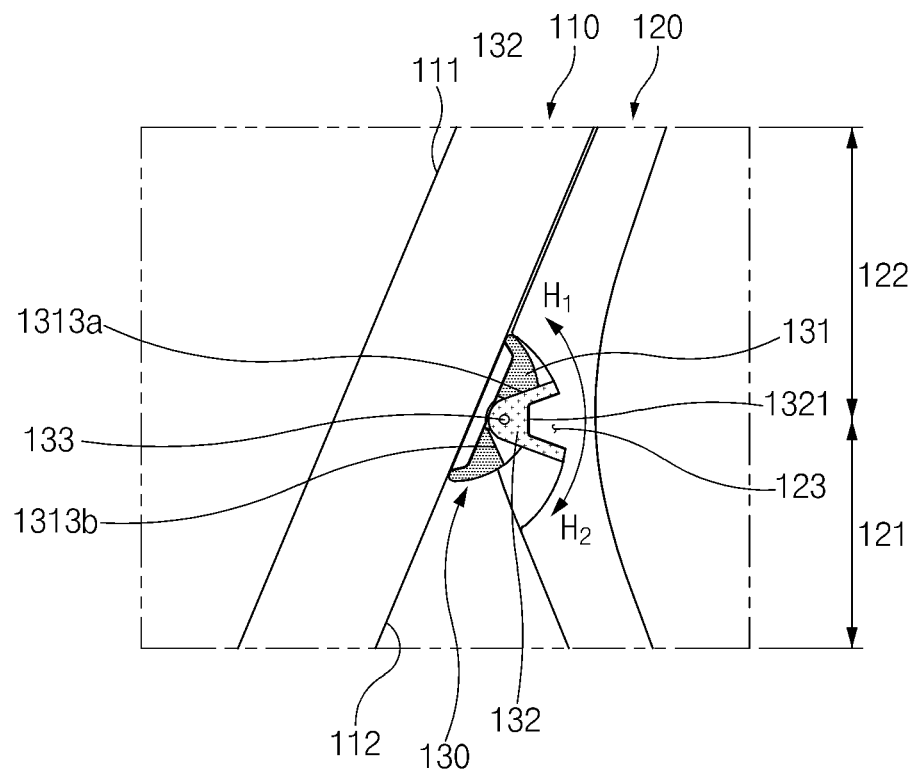
FIG. 4 is a sectional view of the mounting device for the electronic device according to an embodiment.

FIG. 4 is a sectional view of the mounting device 100 for the electronic device according to an embodiment.

Referring to FIG. 4, the support member 120 may include the first portion 121 extending to one side in the radial direction with respect to the hinge shafts 133, the second portion 122 extending to an opposite side in the radial direction, and a protruding portion 123 formed between the first portion 121 and the second portion 122. The first portion 121 and the second portion 122 may be formed to form a predetermined internal angle.

In the illustrated embodiment, the support member 120 may be coupled to the hinge member 132 by inserting the protruding portion 123 into the recess 1321 formed on the hinge member 132. Accordingly, the support member 120 may be rotated about the hinge shafts 133 within a predetermined angle range as the hinge member 132 is rotated.

The mounting device 100 disclosed herein may include various coupling structures of the support member 120 and the hinge member 132. The coupling structures are not limited to the insertion of the protruding portion 123 of the support member 120 into the recess 1321 formed on the hinge member 132.

Referring to FIG. 4, the opening 1313 formed in the first surface 1311 of the hinge housing 131 may guide the range of rotation of the hinge member 132. Specifically, the opening 1313 may include a first end portion 1313a and a second end portion 1313b that support the hinge member 132 that rotates about the hinge shafts 133 (e.g., pivots in the directions H of FIG. 2).

In certain embodiments, the hinge structure 130 may be configured such that the hinge member 132 is rotatable from the first end portion 1313a of the opening 1313 to the second end portion 1313b of the opening 1313. That is, the opposite end portions 1313a and 1313b of the opening 1313 may restrict the range of rotation of the hinge member 132 disposed in the opening 1313.

In certain embodiments, when the hinge member 132 rotates about the hinge shafts 133 in a direction $H_1$, the second portion 122 of the support member 120 may be brought into contact with the second surface 112 of the plate 110, and the first portion 121 of the support member 120 may be supported on the ground. At this time, the first end portion 1313a of the opening 1313 may restrict the hinge member 132 from rotating through a specified angle or more in the direction $H_1$.

In certain embodiments, when the hinge member 132 rotates about the hinge shafts 133 in a direction $H_2$, the first portion 121 of the support member 120 may be brought into contact with the second surface 112 of the plate 110, and the second portion 122 of the support member 120 may be supported on the ground. At this time, the second end portion 1313b of the opening 1313 may restrict the hinge member 132 from rotating through a specified angle or more in the direction $H_2$.

Figure 5A:
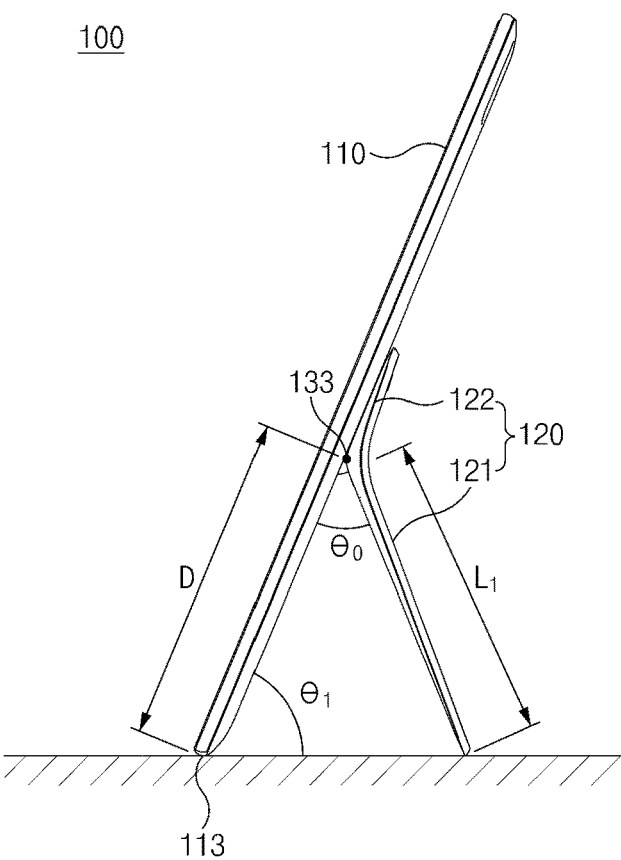
FIGS. 5A and 5B are side views illustrating a portrait mode and a landscape mode of the mounting device for the electronic device according to an embodiment.
Figure 5B:
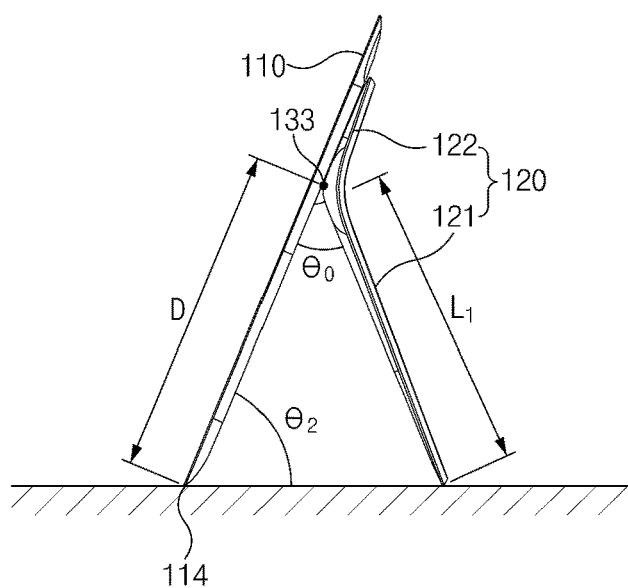

FIG. 5A is a side views illustrating a portrait mode and FIG. 5B is a side view illustrating a landscape mode of the mounting device 100 for the electronic device according to an embodiment.

Referring to FIGS. 5A and 5B, the mounting device 100 may include the portrait mode (FIG. 5A) and the landscape mode (FIG. 5B). The portrait mode (FIG. 5A) may be a mode in which the first portion 121 of the support member 120 and a first edge 113 of the plate 110 are disposed on the ground, and the landscape mode (FIG. 5B) may be a mode in which the first portion 121 of the support member 120 and a second edge 114 of the plate 110 are disposed on the ground.

In an embodiment, in the portrait mode of the mounting device 100, the first portion 121 of the support member 120 and the first edge 113 of the plate 110 may be supported by the ground, and the plate 110 may form a first angle $\theta_1$ with respect to the ground.

In an embodiment, in the landscape mode of the mounting device 100, the first portion 121 of the support member 120 and the second edge 114 of the plate 110 may be supported by the ground, and the plate 110 may form a second angle $\theta_2$ with respect to the ground.

The mounting device 100 according to an embodiment may provide the same or substantially the same view angle $\theta_1 = \theta_2$ in the portrait mode and the landscape mode. In certain embodiments, $\theta_1 = \theta_2$ may be within 3 degrees of each other. To achieve this, the rotary shaft 134 of the hinge structure 130 may be formed in a predetermined position on the plate 110.

Referring to FIGS. 5A and 5B, the length of the first portion 121 of the support member 120 and the internal angle $\theta_0$ between the first portion 121 of the support member 120 and the second surface 112 of the plate 110 may remain constant or substantially constant in the portrait mode and the landscape mode. In certain embodiments, $\theta_0$ may deviate within 3 degrees.

In the illustrated embodiment, in the portrait position, the hinge shafts 133 may be located in a position spaced apart from an edge of the first pair of edges 113 by a distance D. Furthermore, in the landscape position, the hinge shafts 133 may be located in a position spaced apart from an edge of the second pair of edges 114 by the distance D, or substantially the distance D, or within 0.2 inches/5 mm deviation.

Because the distance D in each position is constant (substantially constant, within 0.2 inches/5 mm deviation) and the first portion 121 of the support member 120 has the same (or substantially the same, within 0.2 inches/5 mm deviation) length $L_1$ in each position, the view angle $\theta_2$ in the landscape mode and the view angle $\theta_1$ in the portrait mode may be the same, substantially the same, or within 3 degrees deviation as each other. Hereinafter, "same", "equal", or "constant" shall be understood to mean same/equal/constant, substantially the same/equal/constant, or within 3 degrees deviation if an angle, and 0.2 inches/5 mm if a distance.

That is, it can be seen that the hinge shafts 133 have to be spaced apart from the first edge 113 and the second edge 114 by the same distance D so as to provide the same view angle in the portrait position and the landscape position.

Figure 6:
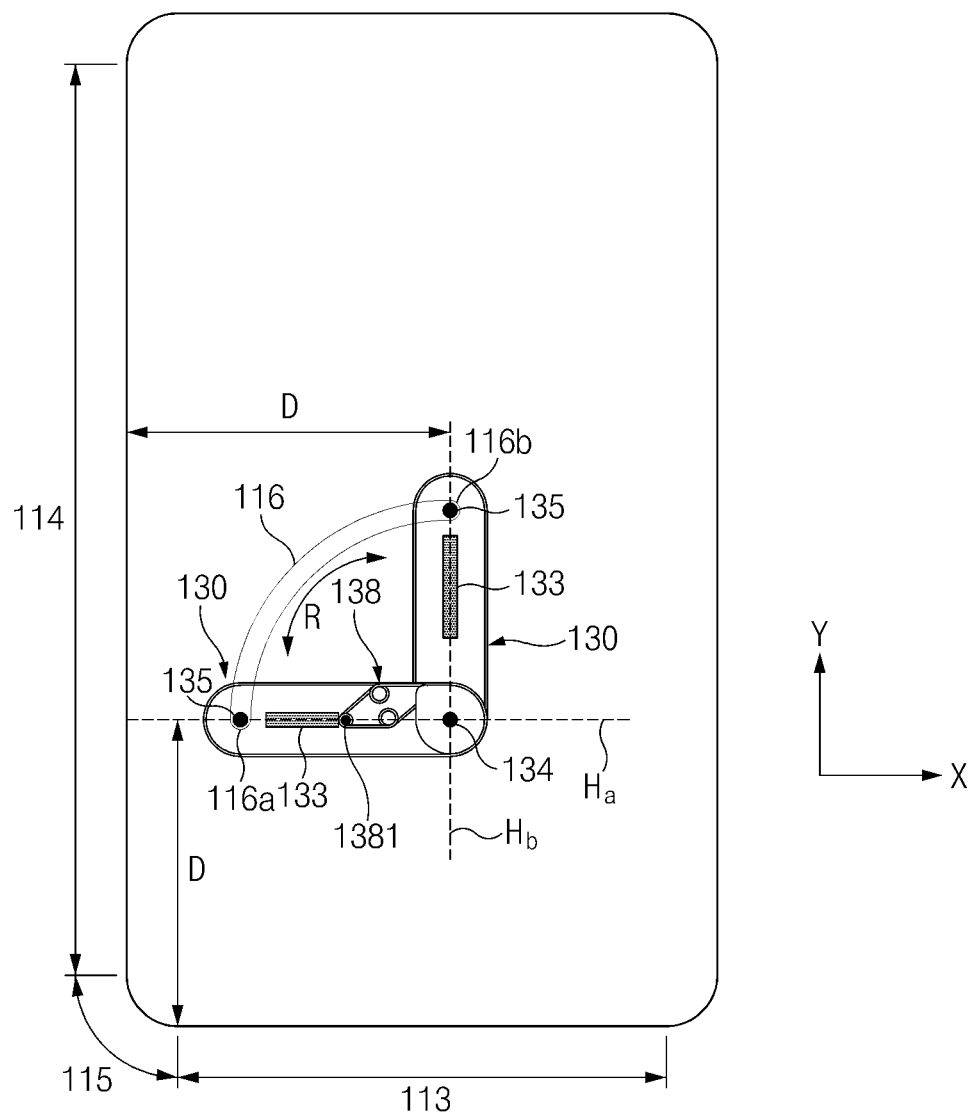
FIG. 6 is a view illustrating rotation of the hinge structure of the mounting device for the electronic device according to an embodiment.
Figure 7:
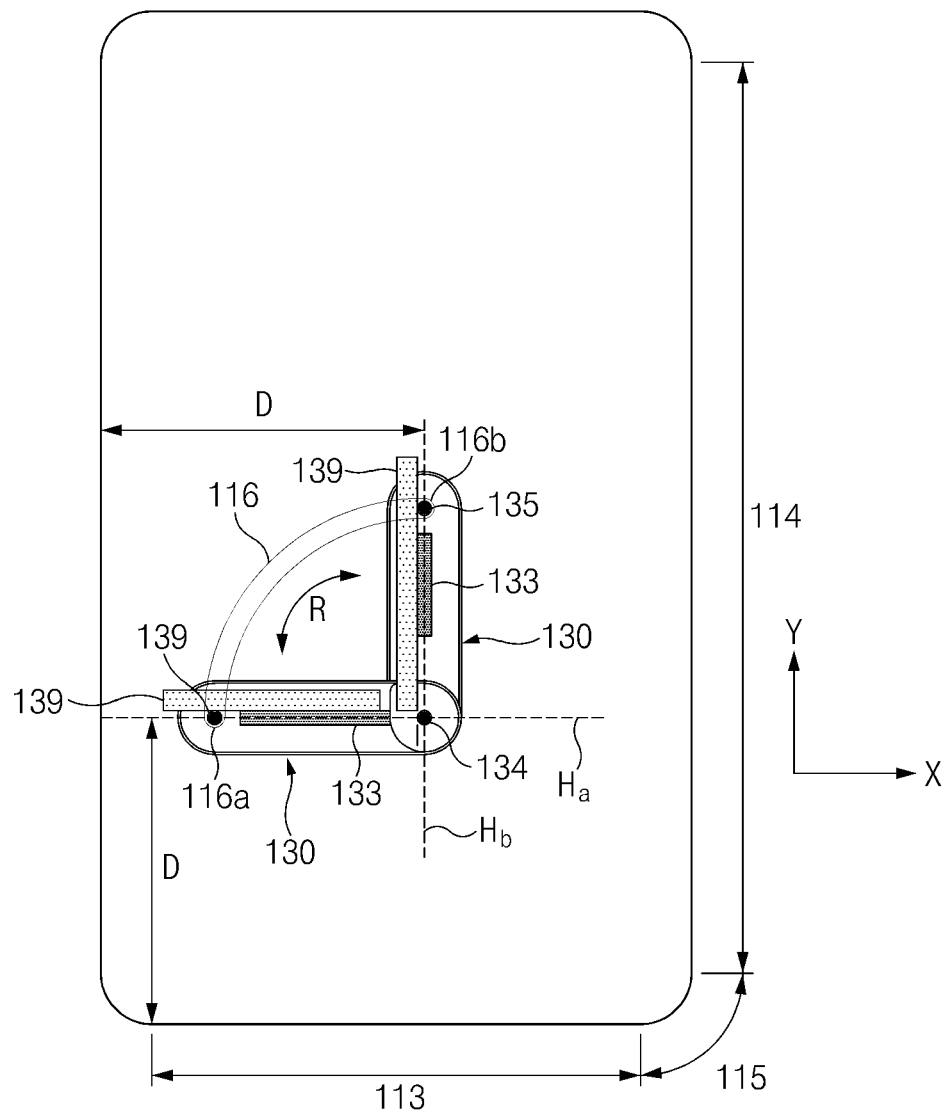
FIG. 7 is a view illustrating rotation of the hinge structure of the mounting device for the electronic device according to certain embodiments.

FIG. 6 is a view illustrating rotation of the hinge structure 130 of the mounting device 100 for the electronic device according to an embodiment. FIG. 7 is a view illustrating rotation of the hinge structure 130 of the mounting device 100 for the electronic device according to certain embodiments.

Referring to FIG. 6, the hinge structure 130 may include the hinge shafts 133 formed therein. The hinge shafts 133 may be connected to the support member 120 and may allow the support member 120 to pivot (e.g., in the directions H of FIG. 2). The hinge shafts 133 may extend in a direction perpendicular to the rotary shaft 134.

For example, the portrait position may be a position in which the hinge shafts 133 are arranged to extend in the direction of the x-axis (in the direction of an axis $H_a$), and the landscape position may be a position in which the hinge shafts 133 are arranged to extend in the direction of the y-axis (in the direction of an axis $H_b$).

In the illustrated embodiment, the hinge structure 130 may be rotated about the rotary shaft 134 (in the directions R) such that the hinge shafts 133 are arranged in the x-axis direction in the portrait position and in the y-axis direction in the landscape position.

In certain embodiments, the plate 110 may include the first pair of edges 113 having a first length and the second pair of edges 114 having a second length greater than the first length. The rotary shaft 134 may be formed in a position spaced apart from one of the first pair of edges 113 and one of the second pair of edges 114 of the plate 110 at the same intervals D. The one of the first edge 113 and the one of the second edge 114 may be perpendicular, substantially perpendicular, or within 3 degrees deviation of perpendicular to each other.

In some embodiments, the plate 110 may include a corner edge 115 formed between the first edge 113 and the second edge 114.

Referring to FIGS. 5A, 5B, and 6, to provide the same view angle ($\theta_1=\theta_2$ of FIGS. 5A and 5B) in the portrait position and the landscape position, the hinge shafts 133 may be disposed in positions spaced apart from the first edge 113 and the second edge 114 by the same distance D.

That is, in the portrait position, the extension line $H_a$ of the hinge shafts 133 may be spaced apart from the first edge 113 by the distance D, and in the landscape position, the extension line $H_b$ of the hinge shafts 133 may be spaced apart from the second edge 114 by the distance D. Accordingly, the same view angle may be provided in the portrait position and the landscape position.

To achieve this, the rotary shaft 134 may be formed at the intersection of the extension line $H_a$ of the hinge shafts 133 in the portrait position and the extension line $H_b$ of the hinge shafts 133 in the landscape position.

Accordingly, even though the hinge structure 130 rotates about the rotary shaft 134 for a position transition (e.g., a transition to the landscape position or a transition to the portrait position), the hinge shafts 133 may maintain the same distance from the edges (the first edge 113 and the second edge 114), and thus the same view angle may be provided in the portrait position and the landscape position.

In certain embodiments, the hinge structure 130 may include the rotary shaft 134 formed on the second surface 112 of the plate 110 and the guide member 135 inserted into a guide groove 116 formed on the second surface 112 of the plate 110.

In the illustrated embodiment, the hinge structure 130 may be rotated about the rotary shaft 134 by a predetermined angle (in the directions R). The hinge structure 130 may be rotated about the rotary shaft 134, and the rotation of the hinge structure 130 may be guided by the guide member 135 that moves along the guide groove 116.

For example, the hinge structure 130 may be substantially rotated within a range of 90 degrees. For example, in the case of a transition from the portrait position (in which the hinge shafts 133 extend in the direction $H_a$) to the landscape position (in which the hinge shafts 133 extend in the direction $H_b$), the hinge structure 130 may rotate (R) about the rotary shaft 134 such that the hinge shafts 133 rotate through 90 degrees (e.g., $H_a \rightarrow H_b$), and the guide member 135 may move from a first position 116a of the guide groove 116 to a second position 116b thereof.

In certain embodiments, the guide groove 116 may have a substantially circular arc shape of 90 degrees.

In some embodiments, the guide member 135 may be formed on the second surface 112 of the plate 110, and the guide groove 116 into which the guide member 135 is inserted may be formed on the hinge structure 130.

In the illustrated embodiment, the hinge structure 130 may further include an elastic member 138. When the rotation angle of the hinge structure 130 is between 0 degrees and 90 degrees, the elastic member 130 may apply an elastic force to the hinge structure 130 such that the rotation angle of the hinge structure 130 is 0 degrees or 90 degrees.

For example, the elastic member 138 may include a torsion spring connected to the rotary shaft 134. The torsion spring may be maintained in an equilibrium state when the rotation angle of the hinge structure 130 is 0 degrees or 90 degrees and may be in a compressed state when the rotation angle of the hinge structure 130 is between 0 degrees and 90 degrees.

For example, the torsion spring may be connected, at one side thereof, to the hinge structure 130 and may be connected, at an opposite side thereof, to a fixed shaft 1381 formed on the second surface 112 of the plate 110.

Accordingly, when the hinge structure 130 is located between 0 degrees and 90 degrees, the torsion spring in the compressed state may move the hinge structure 130 to locate the hinge structure 130 at 0 degrees or 90 degrees.

Referring to FIG. 7, the mounting device 100 may include a first magnet 139 formed on the plate 110 and a second magnet (not illustrated) that is included in the hinge structure 130. For example, an attraction force may be formed between the first magnet 139 and the second magnet (not illustrated).

As illustrated in FIG. 7, the first magnet 139 may be formed to correspond to the position of the hinge structure 130 in the portrait position and the position of the hinge structure 130 in the landscape position. For example, the first magnet 139 may include an area 139a corresponding to the portrait position and an area 139b corresponding to the landscape position, and the areas 139a and 139b may be formed to form an angle of 90 degrees with respect to the rotary shaft 134. Accordingly, when the rotation angle of the hinge structure 130 is between 0 degrees and 90 degrees, the rotation angle of the hinge structure 130 may be guided by the attraction force formed between the first magnet 139 and the second magnet such that the rotation angle is 0 degrees (the portrait position of FIG. 6) or 90 degrees (the landscape position of FIG. 6).

Figure 8A:
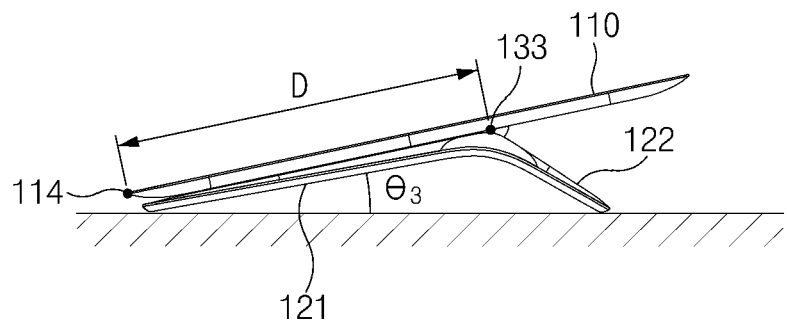
FIGS. 8A and 8B are views illustrating a reclining mode of the mounting device for the electronic device according to an embodiment.
Figure 8B:
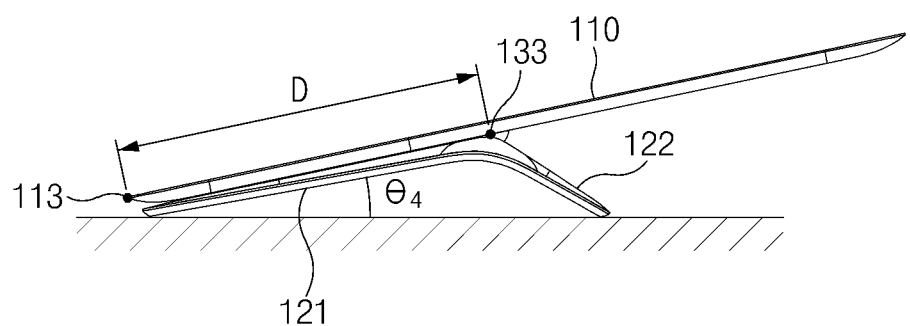

FIGS. 8A and 8B are views illustrating a reclining position of the mounting device 100 according to an embodiment.

In an embodiment, the mounting device 100 may further include a reclining position in which the second portion 122 of the support member 120 is supported by the ground. For example, the reclining position may be a position in which the second portion 122 of the support member 120 is supported on the ground.

View angles $\theta_3$ and $\theta_4$ in the reclining position may be smaller than the view angle in the landscape or portrait position. The angles $\theta_3$ and $\theta_4$ may be formed to be angles at which a user easily performs handwriting or drawing on the electronic device 10 mounted on the mounting device 100. For example, the angles $\theta_3$ and $\theta_4$ may vary depending on the length of the second portion 122 of the support member 120.

In certain embodiments, the reclining position may include a first reclining position (FIG. 8A) in which the second portion 122 of the support member 120 and the second edge 114 are parallel to each other and a second reclining position (FIG. 8b) in which the second portion 122 of the support member 120 and the first edge 113 are parallel to each other. As in the landscape position and the portrait position described above with reference to FIG. 6, the same vie angle $\theta_3=\theta_4$ may be provided in the first reclining position and the second reclining position.

A mounting device 100 according to certain embodiments may include a plate 110 including a first surface 111 and a second surface 112 opposite to the first surface, a hinge structure 130 that is disposed on the second surface 112 of the plate 110 and that includes a rotary shaft 134 extending from the second surface and a hinge shaft extending along the second surface, and a support member 120 that is coupled to the hinge shaft and that includes a first portion 121 extending from the hinge shaft by a first length and a second portion 122 extending from the hinge shaft by a second length smaller than the first length. The hinge structure 130 may be configured to rotate about the rotary shaft 134, and the support member 120 is configured to rotate about the hinge shaft such that the first portion 121 can make contact with the second surface 112 of the plate 110 and the second portion 122 makes can contact with the second surface 112 of the plate 110.

In certain embodiments, the plate 110 may include a first pair of edges 113 and a second pair of edges 114 substantially perpendicular to the first pair of edges 113, and the rotary shaft 134 may be formed in a position that is spaced apart from one of the first pair of edges 113 by a first distance and is spaced apart from one of the second pair of edges 114 by a second distance.

In certain embodiments, the mounting device 100 is configurable to a first position where one of the first pair of edges 113 and the first portion 121 of the support member 120 are supported on the ground and a second position in which one of the second pair of edges 114 and the first portion 121 of the support member 120 are supported on the ground, and the hinge structure 130 may be configured to rotate about the rotary shaft 134 such that the hinge shaft is arranged in the third direction in the first position and is arranged in the fourth direction in the second position.

In certain embodiments, the second portion 122 is configurable to make contact with the second surface 112 of the plate 110 in the first position and the second position.

In certain embodiments, the rotary shaft 134 is disposed at an intersection of an extension line of the hinge shaft when the mounting device is in the first position and an extension line of the hinge shaft when the mounting device is in the second position.

In certain embodiments, the hinge structure 130 may include a hinge housing 131 having the hinge shaft disposed therein and a hinge member 132 that is disposed in the hinge housing 131 and on which the hinge shaft is formed, and the hinge member 132 may be connected, at one side thereof, with the first portion 121 of the support member 120 and may be connected, at an opposite side thereof, with the second portion 122 of the support member 120.

In certain embodiments, the hinge housing 131 includes a curved surface 1311 configured to face the support member 120 the mounting device further comprising a fastening plate 1312 disposed on the second surface 112 of the plate 110 and abutting a flat surface of the hinge housing, and the hinge housing 131 may have an opening in which the hinge member 132 is disposed.

In certain embodiments, the support member 120 may include a protruding portion 123 formed between the first portion 121 and the second portion 122, and the hinge member 132 may have a recess and the protruding portion may be disposed in the recess of the hinge member.

In certain embodiments, at least part of the first surface 1311 of the hinge housing 131 may be formed to be a curved surface having a radius of curvature that is substantially the same as or smaller than a radius of rotation of the support member 120.

In certain embodiments, the hinge housing 131 may have a recess formed therein in which part of the hinge shaft is disposed to support rotation of the hinge shaft.

In certain embodiments, the rotary shaft 134 may extend from the fastening plate 1312.

In certain embodiments, the hinge structure 130 may include a guide member 135 formed in a position spaced apart from the rotary shaft 134 at an interval, the second surface 112 of the plate 110 may have a guide recess into which the guide member 135 is inserted, and the guide recess may be formed in a substantially circular arc shape.

In certain embodiments, the guide recess may include a first end portion and a second end portion, and the hinge structure 130 may be configured to rotate about the rotary shaft 134 as the guide member 135 moves from the first end portion to the second end portion.

In certain embodiments, the guide member 135 may be located on the first end portion in the first position and may be located on the second end portion in the second position.

In certain embodiments, the hinge structure 130 may further include a torsion spring that applies an elastic force such that a rotation angle of the hinge structure 130 is maintained to be 0 degrees or 90 degrees, the plate 110 may further include a fixed shaft formed on the second surface 112 in the second direction, and the torsion spring may be connected, at one side thereof, to the rotary shaft 134 and may be connected, at an opposite side thereof, to the fixed shaft.

In certain embodiments, the plate 110 may further include a magnet that includes a first portion 121 arranged in the third direction perpendicular to the second direction from the rotary shaft 134 and a second portion 122 arranged in a fourth direction that is perpendicular to the third direction and the second direction, the hinge structure 130 may include a corresponding magnet that corresponds to the magnet, and the hinge structure 130 may be rotated such that the hinge shaft is arranged in the third direction or the fourth direction by the magnet and the corresponding magnet.

A mounting device 100 according to certain embodiments may include a plate 110 including a first surface 111 a second surface 112 opposite the first surface, a first pair of edges 113 and a second pair of edges 114 substantially perpendicular to the first pair of edges 113, wherein the first surface is configured to receive an electronic device, a rotary shaft 134 extending from the second surface of the plate 110 so as to be rotatable, and a support member 120 that rotatable about the rotary shaft 134 and that extends from the second surface 112 of the plate 110 at an angle. The mounting device 100 may configurable to a first position in which the support member 120 and one of the first pair of edges 113 are supported on the ground and a second position in which the support member 120 and one of the second pair of edges 114 are supported on the ground, the plate 110 may form the substantially same angle with respect to the ground in the first position and the second position, and the rotary shaft 134 may be formed at substantially the same distance from one of the pair of first edges 113 and one of the pair of second edges 114.

In certain embodiments, the support member 120 may include a first portion 121 supported on the ground in the first position and the second position, a second portion 122 brought into contact with the second surface 112 of the plate 110, and a hinge shaft formed between the first portion 121 and the second portion 122, and the support member 120 may be rotated about the rotary shaft 134 such that an extension direction of the hinge shaft in the first position and an extension direction of the hinge shaft in the second are perpendicular to each other.

In certain embodiments, the support member 120 may include a guide member 135 formed in a position spaced apart from the rotary shaft 134 at a predetermined interval, the plate 110 may have a guide groove 116 into which the guide member 135 is inserted to guide rotation of the support member 120, the guide groove 116 may include a first end portion on which the guide member 135 is located in the first position and a second end portion on which the guide member 135 is located in the second position, and an extension line from the first end portion to the rotary shaft 134 may be substantially perpendicular to an extension line from the second end portion to the rotary shaft 134.

In certain embodiments, the support member 120 may further include an elastic member 138 that applies an elastic force to the guide member 135 to move the guide member 135 to the first end portion or the second end portion when the guide member 135 is located between the first end portion and the second end portion.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to the embodiments of the disclosure, the mounting device includes the hinge shaft that enables a transition to a reclining position and the rotary shaft that enables a transition to a landscape position or a portrait position, thereby providing the reclining position for easy handwriting or drawing and providing the landscape and portrait positions for providing the same view angle. Accordingly, user convenience may be enhanced.

In addition, the disclosure may provide various effects that are directly or indirectly recognized.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A mounting device for mounting an external electronic device, the mounting device comprising:
a plate including a first surface and a second surface opposite to the first surface, the first surface configured to receive the external electronic device, and the second surface defining a guide groove;
a hinge structure disposed on the second surface of the plate, the hinge structure including a rotary shaft extending from the second surface, a hinge shaft extending along the second surface and a guide member inserted into the groove of the second surface of the plate; and
a support member coupled to the hinge shaft, the support member including a first portion extending from the hinge shaft by a first length and a second portion extending from the hinge shaft by a second length smaller than the first length,
wherein the hinge structure is configured to rotate about the rotary shaft via travel of the guide member along the guide groove, and
wherein the support member is configured to rotate about the hinge shaft such that the first portion can make contact with the second surface of the plate and the second portion can make contact with the second surface of the plate.

2. The mounting device of claim 1, wherein the plate includes a first pair of edges and a second pair of edges substantially perpendicular to the first pair of edges, and
wherein the rotary shaft is formed in a position that is spaced apart from one of the first pair of edges by a first distance and is spaced apart from one of the second pair of edges by a second distance.

3. The mounting device of claim 2, wherein the mounting device is configurable to a first position where the one of the first pair of edges and the first portion of the support member are supported on an external surface and a second position where the one of the second pair of edges and the first portion of the support member are supported on the external surface.

4. The mounting device of claim 3, wherein the second portion is configurable to make contact with the second surface of the plate in the first position and the second position.

5. The mounting device of claim 3, wherein the rotary shaft is disposed at an intersection of an extension line of the hinge shaft when the mounting device is in the first position and an extension line of the hinge shaft when the mounting device is in the second position.

6. The mounting device of claim 3, wherein the guide member is formed in a position spaced apart from the rotary shaft at an interval, and
wherein the guide recess has a substantially circular arc shape.

7. The mounting device of claim 6, wherein the guide recess includes a first end portion and a second end portion, and
wherein the hinge structure is configured to rotate about the rotary shaft as the guide member moves from the first end portion to the second end portion.

8. The mounting device of claim 7, wherein the guide member is configured to be located on the first end portion when the mounting device is in the first position and the second end portion when the mounting device is in the second position.

9. The mounting device of claim 2, wherein the plate further includes a magnet that includes a first portion extending from the rotary shaft substantially parallel to the first pair of edges and a second portion substantially parallel to the second pair of edges,
wherein the hinge structure includes a corresponding magnet that corresponds to the magnet, and
wherein the magnet is configured to rotate the corresponding magnet of the hinge structure to be substantially parallel to the first pair of edges or substantially parallel to the second pair of edges.

10. The mounting device of claim 1, wherein the hinge structure includes:
a hinge housing having the hinge shaft disposed therein; and
a hinge member disposed in the hinge housing, the hinge shaft being formed on the hinge member, and
wherein the hinge member is connected, at one side thereof, with the first portion of the support member and is connected, at an opposite side thereof, with the second portion of the support member.

11. The mounting device of claim 10, wherein the hinge housing includes a curved surface configured to face the support member, the mounting device further comprising a fastening plate disposed on the second surface of the plate and abutting a flat surface of the hinge housing, and
wherein the hinge housing has an opening in which the hinge member is disposed.

12. The mounting device of claim 11, wherein the support member includes a protruding portion formed between the first portion and the second portion, and
wherein the hinge member has a recess and wherein the protruding portion is disposed in the recess of the hinge member.

13. The mounting device of claim 11, wherein the curved surface has a radius of curvature that is substantially the same as or smaller than a radius of rotation of the support member.

14. The mounting device of claim 11, wherein the rotary shaft extends from the fastening plate.

15. The mounting device of claim 10, wherein the hinge housing has a recess formed therein in which part of the hinge shaft is disposed to support rotation of the hinge shaft.

16. The mounting device of claim 1, wherein the hinge structure further comprises a torsion spring applying an elastic force maintaining a rotation angle of the hinge structure at substantially 0 degrees or substantially 90 degrees,
wherein the plate further includes a fixed shaft formed on the second surface, and
wherein the torsion spring is connected, at one side thereof, to the rotary shaft and is connected, at an opposite side thereof, to the fixed shaft.

17. A mounting device for an external electronic device, the mounting device comprising:
a plate including a first surface and a second surface opposite to the first surface, a first pair of edges, and a second pair of edges substantially perpendicular to the first pair of edges, wherein the first surface is configured to receive the external electronic device, and the second surface defines a guide groove therein;
a rotary shaft extending from the second surface and coupled to the plate so as to be rotatable; and
a support member rotatable about the rotary shaft as guided by movement of a guide member inserted into the guide groove, the support member extending from the second surface of the plate at an angle,
wherein the mounting device is configurable to a first position in which the support member and one of the first pair of edges are supported on an external surface and a second position in which the support member and one of the second pair of edges are supported on the external surface, wherein the plate forms substantially the same angle with respect to the external surface in the first position and the second position, and wherein the rotary shaft is formed at substantially the same distance from the one of the first pair of edges and the one of the second pair of edges.

18. The mounting device of claim 17, wherein the support member includes a first portion configured to be supported on the external surface in the first position and the second position, a second portion configured to contact with the second surface of the plate, and a hinge shaft disposed between the first portion and the second portion, the guide member extending from a surface of the hinge shaft, and wherein the support member is rotatably connected to the rotary shaft such that the hinge shaft in the first position and is substantially perpendicular to the hinge shaft in the second position.

19. The mounting device of claim 17, wherein the guide member is disposed at an interval from the rotary shaft, wherein the guide groove includes a first end portion on which the guide member is located in the first position and a second end portion on which the guide member is located in the second position, and wherein an extension line from the first end portion to the rotary shaft is substantially perpendicular to an extension line from the second end portion to the rotary shaft.

20. The mounting device of claim 19, wherein the support member further includes an elastic member configured to apply an elastic force to the guide member to move the guide member to the first end portion or the second end portion when the guide member is located between the first end portion and the second end portion.

* * * * *